United States Patent [19]   [11] Patent Number: 5,247,279
Sato                                 [45] Date of Patent: * Sep. 21, 1993

[54] VEHICLE SECURITY SYSTEM WITH GEAR SHIFT POSITION SENSOR AND DOOR INTERLOCK

[75] Inventor: Tsutomu Sato, Iwaki, Japan

[73] Assignee: Alpine Electronics, Inc., Tokyo, Japan

[*] Notice: The portion of the term of this patent subsequent to Nov. 3, 2009 has been disclaimed.

[21] Appl. No.: 628,752

[22] Filed: Dec. 17, 1990

[30] Foreign Application Priority Data

Dec. 18, 1989 [JP] Japan .................................. 1-328982

[51] Int. Cl.$^5$ .......................................... B60R 25/10
[52] U.S. Cl. ...................................... 340/426; 340/430
[58] Field of Search .................. 340/426, 425.5, 539, 340/428, 429, 430, 527, 528, 456, 825.69, 825.72; 180/287; 307/10.1, 10.2

[56] References Cited

U.S. PATENT DOCUMENTS 4,383,242  5/1983 Sassover .............................. 340/429
4,691,801  9/1987 Mann .................................. 180/287
4,866,417  9/1989 DeFino ............................... 340/430
4,908,604  3/1990 Jacob .................................. 340/539

Primary Examiner—Jin F. Ng
Assistant Examiner—Christine K. Oda
Attorney, Agent, or Firm—Guy W. Shoup; Norman R. Klivans

[57] ABSTRACT

A vehicle security system includes a portable transmitter remote control unit for transmitting an arming signal or a disarming signal, a receiver unit mounted on the vehicle for receiving the arming or disarming signal from the transmitter unit, a detector for detecting the gear shift lever park position, an arming-signal reception monitor unit capable of receiving the arming signal from the transmitter unit only if the gear shift lever is in "park", and only if the vehicle door has just been opened and then closed and a security control unit activated to arm the system in response to the arming signal transmitted from the transmitter unit only when the arming-signal reception monitor unit can receive the arming signal. Since the transmission lever cannot be in the "park" position while the vehicle is in motion, the system cannot be armed by the accidental operation of the transmitter unit while the vehicle is in motion.

6 Claims, 3 Drawing Sheets

VEHICLE SECURITY SYSTEM WITH GEAR SHIFT POSITION SENSOR AND DOOR INTERLOCK

BACKGROUND OF THE INVENTION

1. Field of the Invention

The present invention relates to a security system, and more particularly to a security system which can be armed or disarmed by use of a portable transmitter unit.

2. Description of the Related Art

An anti-theft system (also called a "security system") for preventing a vehicle from being stolen operates by sounding a siren or flashing a vehicle headlight when a thief opens the door, gives a considerable impact to the vehicle or opens the trunk when the security system is armed, and also cuts off the starter of the vehicle engine (i.e., de-energizes the engine) or cuts off the supply of fuel to the vehicle so as to prevent operation of the vehicle, thereby preventing the vehicle from being stolen.

In an example of such a security system, initiation (hereinafter called "arming") or termination (hereinafter called "disarming") of the security operation is performed by a portable transmitter remote control unit (hereinafter called the "Remocon" unit). The arming and disarming are effected by pressing either an arming key or a disarming key both provided on the Remocon unit.

In a security system using such a Remocon unit, there is a problematic situation where the system is armed by accidentally operating the Remocon unit by the driver or a passenger while the vehicle is being driven, thereby bringing the security system into an active state. When the system is armed while the vehicle is in motion, a vehicle vibration sensor or a noise sensor in the system immediately detects vehicle vibrations or noise. As a consequence, the siren suddenly sounds, the vehicle headlights are flashed, the starter is cut off or the supply of fuel to the vehicle is cut off to thereby stop the vehicle, causing great danger.

Therefore, a conventional security system operates to avoid receiving all signals such as an arming signal or a disarming signal, which are transmitted from the Remocon unit, when the vehicle ignition switch is turned on.

The conventional security system thus avoids the above danger caused by the accidental operation of the Remocon unit while the vehicle is being driven. However, such a conventional security system has the following shortcomings. When the security system is armed by the accidental operation of the Remocon unit when the ignition switch is not turned on, the security system is thereby armed or disarmed when this is not intended. For example, when the security system is armed by the accidental operation of the Remocon unit when the ignition switch is off, the system makes the judgment that any subsequent movement of the driver or passenger in the vehicle or a sound from an audio apparatus or the like is abnormal, thereby sounding the siren or flashing the vehicle headlights. Thus, the conventional security system does not avoid the problem caused by the above-described accidental operation of the Remocon unit when the ignition switch is off (i.e., the vehicle is parked).

In the above described case a Remocon unit which is inside the vehicle is accidentally operated. On the other hand, when a Remocon unit outside the vehicle is accidentally operated, the driver also does not want to arm the security system. However, the conventional security system cannot avoid such a situation and in response is armed.

SUMMARY OF THE INVENTION

It is an object of the present invention to provide a security system which can avoid arming caused by the accidental operation of a Remocon unit in both the cases of the vehicle being driven or being parked.

According to the present invention, the above-described problems are solved by providing a security system comprising:

a portable transmitter unit for transmitting therefrom either a security-operation arming signal or a security-operation disarming signal;

a receiver unit mounted on a vehicle, for receiving either the arming or disarming signal from the transmitter unit;

a transmission lever (gear shift) position sensor;

an arming-signal reception monitor unit; and a security control unit activated in such a manner as to start the security operation in response to the arming signal transmitted from the transmitter unit.

The security system can receive the arming signal from the transmitter unit only when the transmission (i.e., gear shift) lever for an automatic transmission-type vehicle is in the P position (Park position), and starts the security operation in response to the arming signal transmitted from the transmitter unit in the arming-signal receivable state. Since the transmission lever is not in the P position while the vehicle is being driven, the system cannot be armed while the vehicle is being driven.

Where there is the possibility of accidentally operating the Remocon unit while the vehicle is parked, the system is prevented from being accidentally armed by avoiding putting the transmission lever in the P position.

According to the present invention, as has been described above, since the transmission lever is not shifted to the P position while the vehicle is being driven, the system cannot be armed by accidental operation of the Remocon unit while the vehicle is being driven. In addition, where there is the possibility of accidentally operating the Remocon unit by the driver or anyone else while the vehicle is parked or the engine is stopped, the system is prevented from being armed accidentally by avoiding putting the lever in the P position.

Furthermore, since the arming of the system is prevented after a predetermined period of time has elapsed after the vehicle door has been opened and/or closed, the system cannot be armed unless the door is first opened then closed again, even when the transmission lever is set to the P position (for example when the driver stops for a traffic signal). Therefore even if the transmission lever position sensor has malfunctioned, the system cannot be armed while the vehicle is being driven.

Thus, accidental arming of the system caused by the accidental operation of the Remocon unit is additionally avoided.

According to the present invention, the system can always receive signals other than the arming signal transmitted from the transmission unit, thus making it possible to perform vehicle control functions such as window open/close control by using the Remocon unit while the vehicle is being driven.

The above and other objects, features and advantages of the present invention will become apparent from the following description and the appended claims, taken in conjunction with the accompanying drawings in which a preferred embodiment of the present invention is shown by way of example.

DETAILED DESCRIPTION OF THE INVENTION

Figure 1:
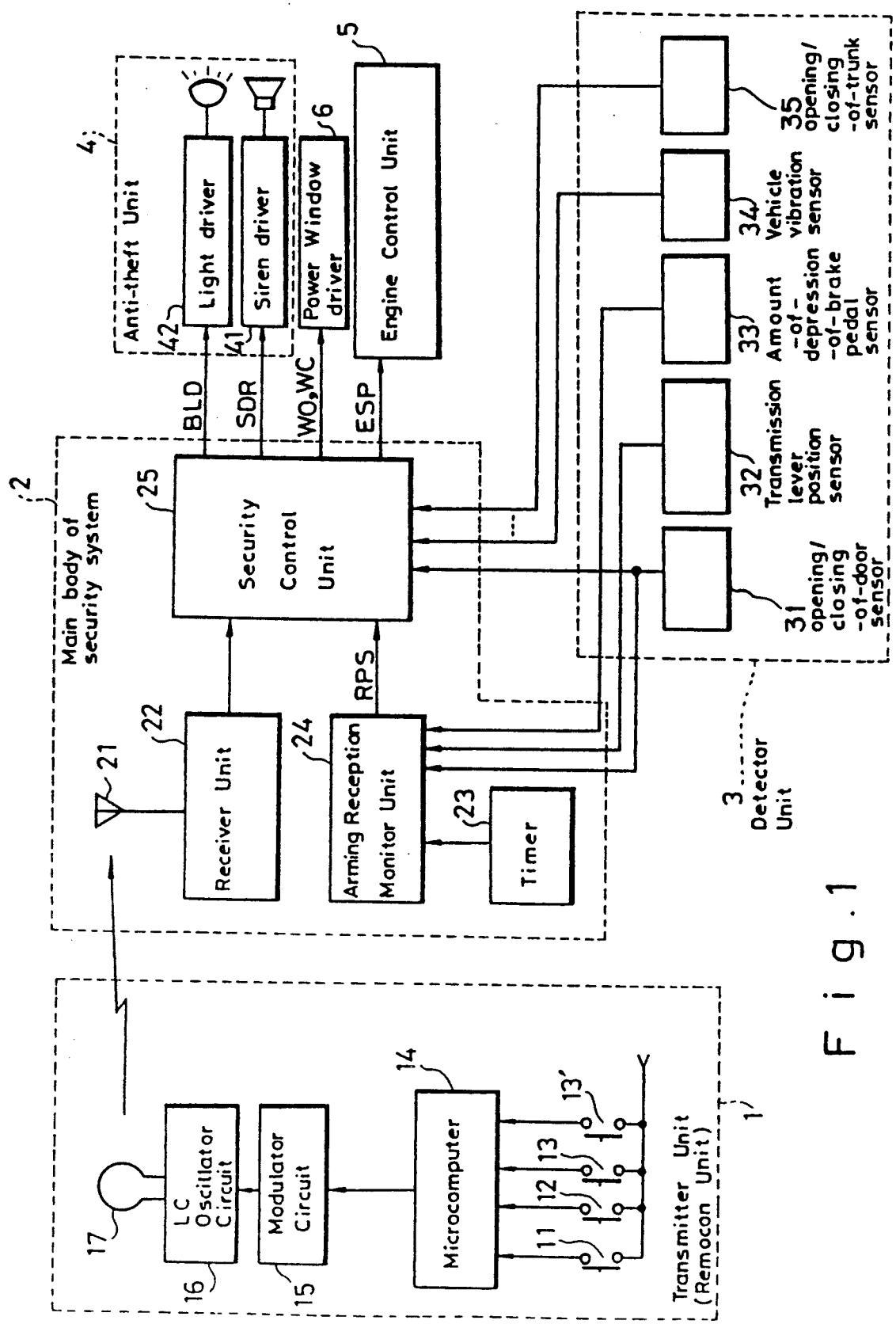
FIG. 1 is a block diagram showing a security system according to one embodiment of the present invention.

FIG. 1 is a block diagram showing a security system according to one embodiment of the present invention. Portable transmitter unit (Remocon Unit) 1 can transmit an arming signal, a disarming signal and window open/close signals to a main body 2 of the security system mounted on the vehicle by a user pressing keys on the unit 1. Shown are an arming key 11, a disarming key 12, a window open key 13, a window close key 13', a microcomputer 14 used to generate a code according to a key to be pressed, a modulator circuit 15 to amplitude-modulate a code inputted from the microcomputer 14 with a carrier of a predetermined frequency, and a LC oscillator circuit 16 to perform power amplification of a modulated signal for radiating a wave representative of the signal thus power-amplified into space from a loop antenna 17 connected to an output side of the oscillator circuit 16. In one embodiment, one (common) key 11 is provided for the arming and disarming operations. When the system is in an armed state, the key 11 is the disarming key. On the other hand, when it is in a disarmed state, the key 11 is the arming key.

Operation of this system is as follows: (1) The security system can respond to receipt of an arming signal from the transmitter unit 1 when a transmission lever for an automatic transmission-type vehicle is at P (park) position and only during a predetermined period of time T after a person opens and then shuts the vehicle door. Then, the security system starts its security operation (arms) in response to the arming signal transmitted from the transmitter unit 1 when the system is in a state in which it can receive the arming signal. (2) The security system can always respond to receipt of other signals, and ceases to perform the security operation (disarms) in response to a disarming signal. (3) The security system controls a desired operation in the vehicle in response to vehicle control signals such as the window open/close signal, etc. The time T referred to above is preferably about 60 seconds. This amount of time is sufficient to arm the system, i.e., 60 seconds after the driver opens and then shuts the door upon leaving the vehicle. Even when arming of the system cannot be performed within the 60 seconds there is no problem of accidental arming.

In the main body 2 of the security system, there is an antenna 21, a receiver unit 22 to receive a signal transmitted from the Remocon unit 1 for thereby demodulating the same, a timer 23, and an arming-signal reception monitor unit 24 capable of responding to receipt of an arming signal or instruction from the Remocon unit 1 when the transmission lever for the automatic transmission-type vehicle is in the P position and during the predetermined period of time after the driver opens and then shuts the door. The arming-signal reception monitor unit 24 determines that the vehicle is being driven when the brake pedal is depressed, even when otherwise it can receive the arming instruction, thereby immediately disabling the reception of the arming signal or instruction.

Security control unit 25 starts the security operation in response to the arming instruction transmitted from the Remocon unit 1 only when the system is in a state in which it can respond to receipt of the arming instruction (i.e., when a reception-enable or receptible signal RPS is in a high-level state). Security control unit 25 can always receive other instructions and discontinue the security operation (disarm) based on a disarming instruction. Further, security control unit 25 controls the respective portions of the vehicle based on vehicle control instructions such as a window open/close instruction, etc.

Detector unit 3 detects the position of the transmission lever, the amount of depression of the brake pedal, the vibration of the vehicle, noise produced in the interior of the vehicle, the state of opening/closing of a trunk, etc. The detector unit 3 is provided with a state-of-opening/closing-of-door sensor 31, a transmission lever position sensor 32, an amount-of-depression-of-brake pedal sensor 33, a vehicle vibration sensor 34, a state-of-opening/closing-of-trunk sensor 35, and similar conventional sensors.

Anti-theft unit 4 comprises a siren driver 41 for sounding a siren in response to a siren drive signal SDR from the security control unit 25 when malfunctions are detected by the respective sensors while the system is armed, and a light driver 42 for flashing the vehicle head lights in response to a flashing drive signal BLD.

When each of the sensors detects the associated condition under the security operation (armed state) of the system, the engine control unit 5 cuts off the engine from starting or cuts off the fuel supply in response to a signal ESP from the security control unit 25, thereby preventing the engine from starting.

Window driver 6 opens a vehicle window when the main body 2 of the security system receives the window open/close instruction transmitted from the Remocon unit 1.

Figure 2A:
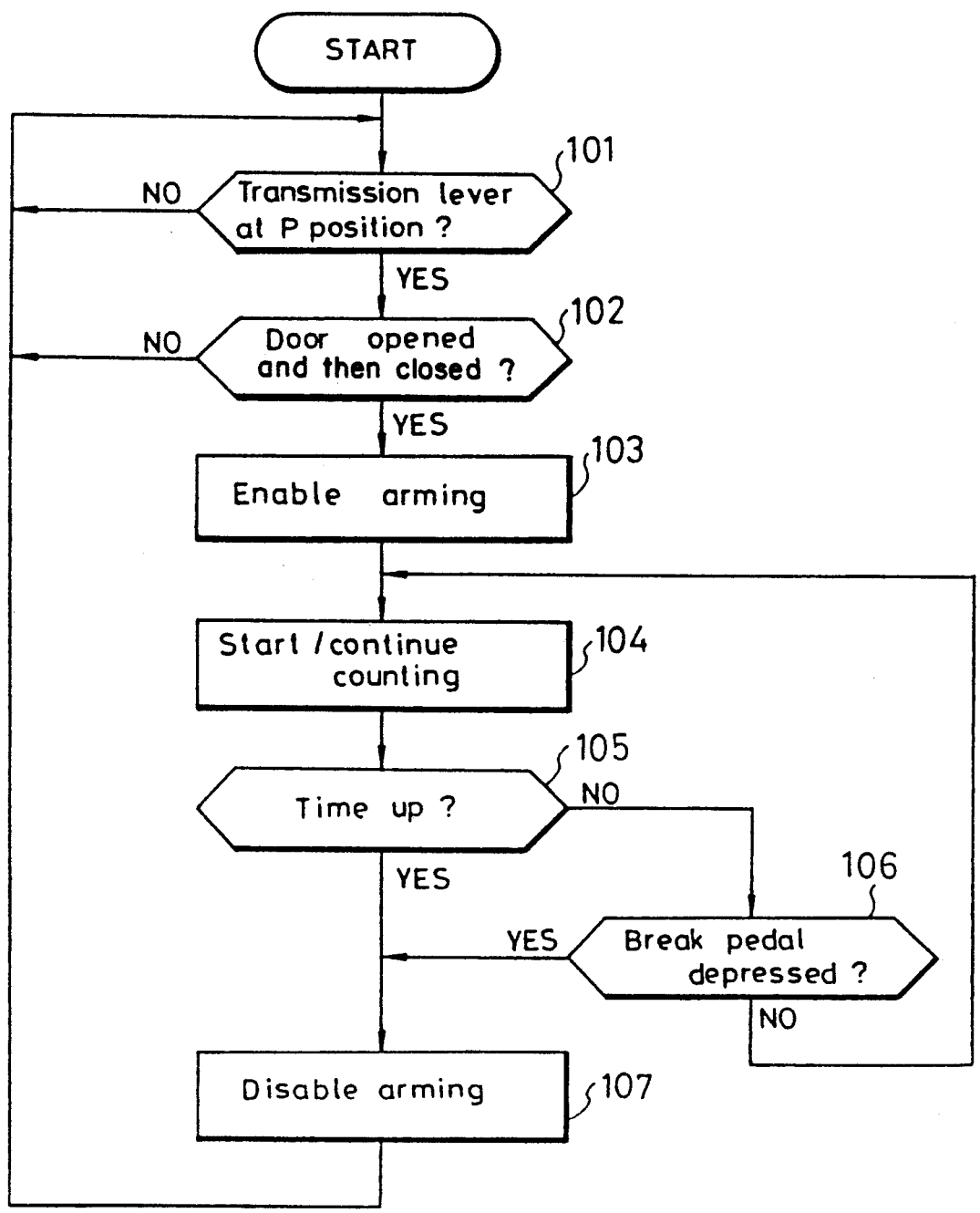
FIGS. 2(a) and 2(b) are flow charts for describing the arming operation according to the present invention.
Figure 2B:
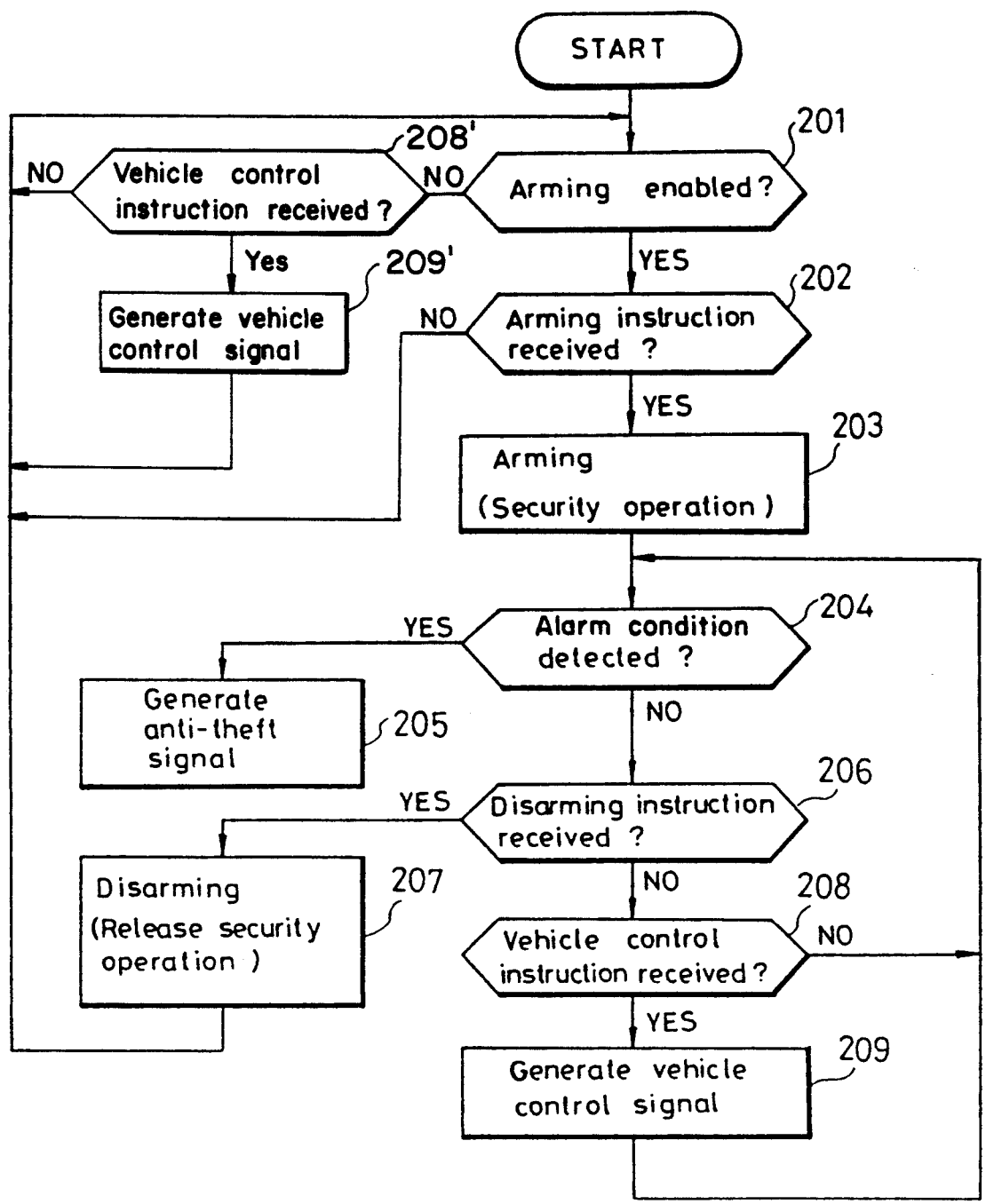

FIGS. 2(a) and 2(b) describe the arming operation according to the present invention. FIG. 2(a) shows processing of the arming-signal reception monitor unit 24 and FIG. 2(b) shows processing of the security control unit 25. The overall operation of the security system shown in FIG. 1 is hereinafter described.

The system is disarmed when in an initial condition or starting state. Thus, the arming-signal reception monitor unit 24 renders the receptible signal RPS low in level. Therefore, the security control unit 25 does not perform the security operation (arm) even when the arming instruction is received from the Remocon unit 1. In this state, the arming-signal reception monitor unit 24 monitors whether or not the transmission lever for an automatic transmission-type vehicle is at the P position (in Step 101) and whether or not the vehicle door position changes from open to closed (in Step 102) based on outputs from the transmission lever position sensor 32 and the state-of-opening/closing-of-door sensor 31.

When the transmission lever is at the P position and the door has been opened then closed, the arming-signal reception monitor unit 24 renders the signal RPS high in level so as to enable the arming of the security system (in Step 103) and to start counting the time (in Step 104).

Then, the arming-signal reception monitor unit 24 checks whether or not the predetermined period of time T seconds (for example 60 seconds) has elapsed since it has started counting the time (in Step 105). If the answer is negative, the arming-signal reception monitor unit 24 checks whether or not the brake pedal is depressed based on an output from the amount-of-depression-of-brake pedal sensor 33 (in Step 106). If this is negative, the arming-signal reception monitor unit 24 continues to count the time. If it is determined that 60 seconds have elapsed or if it is determined that the brake pedal has been depressed, the arming-signal reception monitor unit 24 renders the receptible signal RPS low in level to thereby prevent the arming of the system (in Step 107). Thereafter, the procedure returns to Step 101 and the subsequent processing is repeated.

On the other hand, the security control unit 25 is referred to the level of the receptible signal RPS to thereby monitor whether or not the system is in an arming enable state (in Step 201). When the signal RPS is rendered high in level after the door has been opened then closed while the transmission lever is at the P position to thereby bring the system into the arming enable state, the security control unit 25 checks if the arming instruction has been received from the Remocon unit 1 (in Step 202). If the answer is negative, the procedure returns to Step 201 and the subsequent processing is repeated.

When the arming instruction is received from the Remocon unit 1 in the arming enable state, the answer is positive in Step 202. Thus, the security control unit 25 is brought into a security active state (in Step 203).

Thereafter, the security control unit 25 monitors whether or not an alarm condition has been detected based on the output of each sensor (in Step 204). If Step 204 is determined to be positive, the security control unit 25 outputs the siren drive signal SDR and the flashing drive signal BLD and also produces the engine start prohibition signal ESP, thereby preventing the vehicle from being stolen (in Step 205).

On the other hand, if Step 204 is negative, the security control unit 25 checks whether or not the disarming instruction has been received (in Step 206). If Step 206 is positive, the security operation is released (i.e., disarmed, in Step 207), and the procedure is returned to Step 201.

If it is determined that the disarming signal has not been received, the security control unit 25 checks if the window open/close instruction has been received (in Step 208). If it is determined that the window open/close instruction has not been received, the procedure subsequent to Step 204 is performed repeatedly. If Step 208 is positive, the security control unit 25 outputs a window opening signal WO or closing signal WC (a control signal) thereby open and/or close a window in Step 209. Thereafter, the procedure subsequent to Step 204 is performed repeatedly. As mentioned previously, the security control unit 25 can receive and respond to the window open/close instruction even when the unit is not in the armed state (not shown in FIG. 2(b)).

The above description is for the case where the system can be armed when the transmission lever is at the P position and only during the predetermined period of time after the door, has been opened and then closed. However, the arming of the system may be performed in other embodiments regardless of the opening/closing operation of the door when the transmission lever is at the P position.

In these other embodiments of the invention, in order to inhibit the arming of the system while the vehicle is in forward motion, a state never likely to happen while the vehicle is in motion is detected to thereby bring the system into the arming enable state. For example, a sensor for detecting whether or not a parking brake (hand brake) has been set is provided. When the sensor detects that the parking brake has been set, the system is brought into the arming enable state. Alternatively, the system may also be brought into the arming enable state only when the transmission lever is in the reverse gear position.

Further, in another embodiment, a door handle lock sensor may be disposed in a door handle lock mechanism. When the door handle lock has been locked, the system can be brought into the arming enable state. More specifically, when the key is inserted into the lock cylinder mounted on a shaft of the door handle and then turned, the door handle lock is locked. When the state of the door handle lock is detected by the sensor and the lock is unlocked, the arming of the system by the Remocon unit is disabled, while arming of the system is enabled only when the door handle lock is locked.

Having now fully described the invention, it will be apparent to those skilled in the art that many changes and modifications can be made without departing from the spirit or scope of the invention as set forth herein.

What is claimed is:

1. A security system comprising:
   a portable transmitter for transmitting therefrom a security-operation arming signal;
   a receiver mounted on a vehicle, for receiving therein the arming signal;
   means for detecting if a gear shift of the vehicle is in the parked position;
   an arming unit for receiving an arming instruction only when the gear shift is detected to be in the parked position; and
   a security control unit activated when said arming unit receives the arming instruction.

2. The system of claim 1, further comprising a detector for detecting operation of a door of the vehicle, and wherein said arming unit is capable of receiving the arming instruction only during a predetermined period of time after the door operation is detected.

3. A vehicle security system comprising:
   a remote transmitter for arming the system;
   a detector for detecting if a gear shift of the vehicle is in the parked position; and
   means for preventing arming of the system unless the gear shift of the vehicle is detected to be in the parked position.

4. The system of claim 3, further comprising:
   a second detector for detecting operation of a door of the vehicle; and
   second means for preventing arming of the system unless the remote transmitter attempts to arm the system within a predetermined amount of time of the detection of operation of the door.

5. A vehicle security system comprising:
   a remote transmitter for arming the system;
   a detector for detecting operation of a door of the vehicle; and
   means for preventing arming of the system unless the remote transmitter attempts to arm the system within a predetermined time of detection of the operation of the door.

6. The system of claim 5, further comprising means for receiving a disarming signal from the remote transmitter at any time.

* * * * *